US008632673B2

(12) United States Patent  
Kressmann et al.

(10) Patent No.: US 8,632,673 B2  
(45) Date of Patent: Jan. 21, 2014

(54) PROCESS FOR CATALYTIC HYDROTREATING OF SOUR CRUDE OILS

(75) Inventors: Stephane Cyrille Kressmann, Dhahran (SA); Raheel Shafi, Dhahran (SA); Esam Z. Hamad, Dhahran (SA); Bashir Osama Dabbousi, Al-Khobar (SA)

(73) Assignee: Saudi Arabian Oil Company (SA)

( * ) Notice: Subject to any disclaimer, the term of this patent is extended or adjusted under 35 U.S.C. 154(b) by 1019 days.

(21) Appl. No.: 12/324,418

(22) Filed: Nov. 26, 2008

(65) Prior Publication Data

US 2009/0139902 A1 Jun. 4, 2009

Related U.S. Application Data

(60) Provisional application No. 60/990,751, filed on Nov. 28, 2007.

(51) Int. Cl.  
C10G 45/04 (2006.01)  
C10G 45/10 (2006.01)  
C10G 45/58 (2006.01)  
C10G 47/02 (2006.01)

(52) U.S. Cl.  
USPC ............ 208/89; 208/108; 208/211; 208/212; 208/213; 208/216 R; 208/217; 208/251 H

(58) Field of Classification Search  
USPC ....... 208/89, 108, 211, 212, 213, 216 R, 217, 208/251 H  
See application file for complete search history.

(56) References Cited

U.S. PATENT DOCUMENTS

| | | |
|---|---|---|
| 2,560,433 A | 7/1951 | Gilbert et al. |
| 2,600,931 A | 6/1952 | Slater |
| 2,646,388 A | 7/1953 | Crawford et al. |
| 2,755,225 A | 7/1956 | Porter et al. |
| 2,771,401 A | 11/1956 | Shepherd |
| 2,909,476 A | 10/1959 | Hemminger |
| 2,912,375 A | 11/1959 | MecLaren |
| 2,939,835 A | 6/1960 | Varga et al. |
| 3,119,765 A | 1/1964 | Corneil et al. |
| 3,142,545 A * | 7/1964 | Raarup et al. ............... 208/65 |
| 3,262,874 A | 7/1966 | Gatsis |
| 3,501,396 A | 3/1970 | Gatsis et al. |
| 3,617,524 A | 11/1971 | Conn |
| 3,623,974 A | 11/1971 | Mounce |
| 3,684,688 A | 8/1972 | Roselius |
| 3,686,093 A | 8/1972 | Irvine |
| 3,694,351 A | 9/1972 | White |
| 3,706,657 A | 12/1972 | Paraskos et al. |
| 3,730,879 A | 5/1973 | Christman et al. |
| 3,730,880 A | 5/1973 | Van der Toorn et al. |
| 3,787,315 A | 1/1974 | Bearden, Jr. et al. |
| 3,806,444 A | 4/1974 | Crouch et al. |
| 3,809,644 A | 5/1974 | Johnson et al. |
| 3,826,737 A | 7/1974 | Pegels et al. |
| 3,876,530 A | 4/1975 | Frayer et al. |
| 3,876,533 A | 4/1975 | Myers |
| 3,887,455 A | 6/1975 | Hamner et al. |
| 3,901,792 A | 8/1975 | Wolk et al. |
| 3,915,841 A | 10/1975 | Murphy, Jr. et al. |
| 3,926,784 A | 12/1975 | Christman et al. |
| 3,957,622 A | 5/1976 | Gatsis et al. |
| 3,976,559 A | 8/1976 | Bearden, Jr. et al. |
| 4,003,823 A | 1/1977 | Baird, Jr. et al. |
| 4,003,824 A | 1/1977 | Baird, Jr. et al. |
| 4,006,076 A | 2/1977 | Christensen et al. |
| 4,007,109 A | 2/1977 | Baird, Jr. et al. |
| 4,007,111 A | 2/1977 | Baird, Jr. |
| 4,017,381 A | 4/1977 | Baird, Jr. et al. |
| 4,017,382 A | 4/1977 | Bonnell et al. |
| 4,045,182 A | 8/1977 | Bonnell |
| 4,045,331 A | 8/1977 | Ward |
| 4,048,060 A | 9/1977 | Riley |
| 4,052,295 A | 10/1977 | Pronk |
| 4,076,613 A | 2/1978 | Bearden, Jr. |
| 4,089,774 A | 5/1978 | Oleck et al. |
| 4,118,310 A | 10/1978 | Frayer et al. |
| 4,119,528 A | 10/1978 | Baird, Jr. et al. |
| 4,120,779 A | 10/1978 | Baird, Jr. et al. |
| 4,120,780 A | 10/1978 | Morimoto et al. |
| 4,234,402 A | 11/1980 | Kirkbride |
| 4,259,294 A * | 3/1981 | Van Zijll Langhout et al. .......................... 208/210 |
| 4,332,671 A | 6/1982 | Boyer |
| 4,348,270 A | 9/1982 | Bearden, Jr. et al. |
| 4,406,777 A * | 9/1983 | Melconian ................... 208/156 |
| 4,411,768 A | 10/1983 | Unger et al. |
| 4,431,525 A | 2/1984 | Hensley, Jr. et al. |
| 4,431,526 A | 2/1984 | Simpson et al. |
| 4,568,450 A | 2/1986 | Ting et al. |
| 4,588,709 A | 5/1986 | Morales et al. |
| 4,617,110 A | 10/1986 | Hinojos et al. |
| 4,619,759 A | 10/1986 | Myers et al. |

(Continued)

FOREIGN PATENT DOCUMENTS

| | | |
|---|---|---|
| AU | 8544833 A | 1/1986 |
| BE | 894513 | 1/1983 |

(Continued)

Primary Examiner — Randy Boyer  
(74) Attorney, Agent, or Firm — Bracewell & Giuliani LLP

(57) ABSTRACT

A continuous process for upgrading sour crude oil by treating the sour crude oil in a two step process that includes a hydro-demetallization section and a hydro-desulfurization section, both of which are constructed in a permutable fashion so as to optimize the operating conditions and catalyst lifespan to produce a high value crude oil having low sulfur and low organometallic impurities.

15 Claims, 11 Drawing Sheets

(56) References Cited

U.S. PATENT DOCUMENTS

| | | | |
|---|---|---|---|
| 4,626,340 A | 12/1986 | Galiasso et al. | |
| 4,642,179 A | 2/1987 | Morales et al. | |
| 4,652,361 A | 3/1987 | Kukes et al. | |
| 4,657,665 A | 4/1987 | Beaton et al. | |
| 4,729,826 A | 3/1988 | Lindsay et al. | |
| 4,832,829 A | 5/1989 | de Agudelo et al. | |
| 4,894,144 A | 1/1990 | Newman et al. | |
| 4,925,554 A | 5/1990 | Sato et al. | |
| 4,968,409 A | 11/1990 | Smith | |
| 5,009,768 A | 4/1991 | Galiasso et al. | |
| 5,045,177 A | 9/1991 | Cooper et al. | |
| 5,076,008 A | 12/1991 | Stangeland et al. | |
| 5,176,820 A | 1/1993 | Lew | |
| 5,178,749 A | 1/1993 | Lopez et al. | |
| 5,258,115 A | 11/1993 | Heck et al. | |
| 5,264,188 A | 11/1993 | Lew | |
| 5,382,349 A * | 1/1995 | Yoshita et al. | 208/49 |
| 5,417,846 A * | 5/1995 | Renard | 208/210 |
| 5,591,325 A | 1/1997 | Higashi | |
| 5,779,992 A | 7/1998 | Higashi | |
| 5,916,529 A | 6/1999 | Scheuerman | |
| 5,925,236 A | 7/1999 | Duddy et al. | |
| 6,132,597 A | 10/2000 | Harle et al. | |
| 6,235,190 B1 | 5/2001 | Bertram | |
| 6,270,654 B1 | 8/2001 | Colyar et al. | |
| 6,280,606 B1 | 8/2001 | Morel et al. | |
| 6,306,287 B1 | 10/2001 | Billon et al. | |
| 6,309,537 B1 | 10/2001 | Harle et al. | |
| 6,447,671 B1 | 9/2002 | Morel et al. | |
| 6,554,994 B1 | 4/2003 | Reynolds et al. | |
| 6,620,311 B2 | 9/2003 | Morel et al. | |
| 2001/0027936 A1 | 10/2001 | Morel et al. | |
| 2004/0055934 A1 | 3/2004 | Tromeur et al. | |
| 2005/0082202 A1 | 4/2005 | Ackerson et al. | |
| 2005/0155909 A1 | 7/2005 | Inomata et al. | |
| 2006/0060501 A1 | 3/2006 | Gauthier et al. | |
| 2006/0060509 A1 | 3/2006 | Miyauchi et al. | |
| 2006/0254956 A1 | 11/2006 | Khan | |
| 2007/0187294 A1 | 8/2007 | Ancheyta Juarez et al. | |

FOREIGN PATENT DOCUMENTS

| | | |
|---|---|---|
| DE | 2138853 A | 8/1974 |
| DE | 2655260 A1 | 6/1977 |
| EP | 0113283 B1 | 7/1984 |
| EP | 0113297 B1 | 7/1984 |
| EP | 0450997 B1 | 10/1991 |
| EP | 0732389 B1 | 8/2001 |
| EP | 1600491 A1 | 11/2005 |
| EP | 1652905 A | 5/2006 |
| FR | 2415136 A | 8/1979 |
| FR | 2681871 A1 | 4/1993 |
| FR | 2784687 A1 | 4/2000 |
| GB | 438354 | 4/1934 |
| GB | 710342 | 9/1950 |
| GB | 744159 | 7/1953 |
| GB | 0721357 | 1/1955 |
| GB | 830923 | 3/1956 |
| GB | 786451 | 11/1957 |
| GB | 1073728 | 7/1964 |
| GB | 1181982 | 6/1967 |
| GB | 1335348 | 2/1970 |
| GB | 1523992 | 9/1978 |
| GB | 2026533 A | 2/1980 |
| GB | 2066287 A | 7/1981 |
| GB | 2124252 A | 2/1984 |
| GB | 2150852 A | 12/1984 |
| JP | 71034507 B | 7/1968 |
| JP | 49015703 A | 2/1974 |
| JP | 49051303 A | 5/1974 |
| JP | 74037085 B | 10/1974 |
| JP | 48054105 A | 10/1975 |
| JP | 76038722 B | 10/1976 |
| JP | 60065093 A | 4/1985 |
| JP | 2000265177 A | 3/1999 |
| NL | 6916017 A | 4/1970 |
| NL | 7213105 | 9/1972 |
| NL | 7115994 A | 9/1974 |
| NL | 7117302 A | 10/1974 |
| RU | 2074883 C1 | 3/1997 |
| WO | 0198436 A1 | 12/2001 |
| WO | 2004078889 A1 | 9/2004 |
| WO | 2006039429 A | 4/2006 |
| WO | 2006114489 A1 | 11/2006 |
| WO | 2009073436 A2 | 6/2009 |

* cited by examiner

Permutation R3 then R4

Permutation R4 then R3

Four Reactors: Two HDM reactors and two HDS reactors

Six Reactors

FIVE-REACTOR PROCESS

PROCESS FOR CATALYTIC HYDROTREATING OF SOUR CRUDE OILS

RELATED APPLICATIONS

This patent application claims priority to U.S. Provisional Patent Application Ser. No. 60/990,751 filed on Nov. 28, 2007, which is incorporated by reference in its entirety.

TECHNICAL FIELD OF THE INVENTION

The present invention relates to a pre-refining process for the desulfurization of sour crude oils using a catalytic hydrotreating process that includes permutable reactors, and is capable of operating at both a moderate temperature and pressure with reduced hydrogen consumption.

BACKGROUND OF THE INVENTION

The removal of sulfur compounds from crude oil and its fractions has been of significant importance for several decades, but has become even more important in recent years due to tightening environmental legislation. While much of the prior art focuses on the desulfurization of individual crude oil fractions, a large segment of the art today and in the past has addressed the requirement for hydroprocessing of whole crude oil. The majority of the interest in recent years has been on the upgrading of very heavy (API gravity <20) crude oil, shale and tar-sands to produce light sweet synthetic crudes. The major driving force for these processes is the demand for light crude oils in refineries and the low value of highly viscous feedstocks. Furthermore, demand is shifting from high sulfur fuel oils to low- and ultra-low sulfur products, 1 wt % (LSFO) and 0.5 wt % (ULSFO). Therefore, the ability to produce LSFO or ULSFO instead of high sulfur fuel oils is advantageous.

One of the major technical challenges posed when hydrotreating heavy oil fractions or whole crude is the effect of minor concentrations of contaminants such as organic nickel and vanadium compounds. These organometallic components have been proven to detrimentally impact the activity of hydrotreating catalysts.

Another major challenge faced by processing whole crude oil is that the concentration of coke precursors is very high. These coke precursors, such as asphaltenic plates detrimentally impact the activity of the hydro-desulfurization (HDS) catalysts in question. This means that the performance of a conventional process would decrease over time, requiring catalyst replacement to ensure continued profitable operation. This catalyst replacement can be costly and also time consuming, significantly impacting the economic feasibility of such a process.

Conventionally, hydro-demetallization (HDM) and HDS reactors are arranged and connected in series with the feedstock being processed sequentially by each of the reactors. The reactant species within the feedstock; therefore, have a concentration gradient when moving in an axial position down the catalyst bed, continuing in subsequent reactors. This concentration gradient causes the catalyst in the reactor where the feed is first incident to experience the highest concentration of reactant species.

Consequently, the lifetime of the catalysts in the reactor depends on their position in the loading scheme, with the catalysts at the inlet of the first sequential reactor experiencing a significantly higher concentration of deactivating metal compounds than the equivalent catalysts at the outlet of the final sequential reactor. Consequently, in conventional reactor systems, the catalysts at the inlet of the first HDM sequential reactor would be, at some point in the cycle, significantly deactivated whilst catalysts at the outlet of final sequential reactor would be deactivated to a significantly lower extent. Additionally, as catalysts become contaminated with these metals, the catalyst performance decreases and the possibility of pressure drop increases, which further increases operating costs. And because typical HDM and HDS systems are constricted in a sequential fashion, the unit must be shut down in order to replace or regenerate or rejuvenate the spent catalysts. These two phenomena can significantly reduce the on-stream cycle length, which negatively impacts the operating costs. In the event of one or both of the above phenomena, the on stream cycle is terminated prematurely whilst the catalyst in the second reactor has not be fully utilized.

Therefore, there is a need for a safe and cost effective solution to decreasing time spent replacing or regenerating spent catalyst, while at the same time fully utilizing all of the catalysts within a given reactor.

SUMMARY OF THE INVENTION

The present invention provides a system to significantly increase the utilization of both the HDM catalyst and the HDS catalyst by employing a permutable reactor system. A permutable reactor system is simply one that affords the flexibility to allow the reactors within the reactor circuit to be aligned in different permutations. In the present invention, the flow of the feedstock can be changed from being incident on the primary reactors to being incident primarily on the secondary reactors of both the HDM section and HDS section. During the permutation, the catalyst from the lead reactor can be rejuvenated and/or removed and replaced with fresh catalyst, whilst keeping the remainder of the reactor circuit operational. This means that the overall catalyst life is increased. The present invention therefore provides increased metals uptake and sulfur removal and therefore aids the desulfurization of the whole crude for an increased on stream time.

This invention is intended for the selective removal of sulfur containing compounds from whole crude oils. More particularly, this invention focuses on the use of catalytic hydrotreating processes in the form of a fixed catalyst bed. The catalytic section is defined as having a hydro-demetallization (HDM) section, followed by a hydro-desulfurization (HDS) section. The two stages are required for the removal of between 50-95% of the sulfur content in the sour crude at moderate temperature and pressure conditions and with reduced hydrogen consumption. The process may include a distillation (topping) step to remove low boiling fractions, defined lighter and including naphtha, from the whole crude, thereby reducing the volume of material to be processed and the degree of vaporization of the feedstock providing a maximized hydrogen partial pressure.

In both cases, the residual fraction or the whole crude oil is catalytically hydrotreated using a catalyst and hydrogen. In the case of the removal of lighter fractions, the invention also covers its subsequent recombination with the hydrotreated fraction reconstituting the full range crude.

Once the primary HDM reactor's catalyst has reached its useful life, which is evidenced by a decrease in the catalyst performance, such as an increase of the metals concentration in the effluent of the HDM section, an increase in the sulfur concentration of the effluent in the HDS section, a significant increase in pressure drop in the HDM/HDS section, or an increase in the weighted average bed temperature of a reactor, the present invention allows for a permutation. In other words, the flow changes from being incident first on the catalyst in the primary HDM reactor to now being incident on the catalyst in the secondary HDM reactor, which possess a significantly higher fraction of its initial activity than the catalyst in the primary HDM reactor. This permutation sequence therefore enables increased catalyst utilization, which prolongs the cycle length, enabling the process to function with a higher on stream factor and therefore increase profitability. In an additional embodiment, during the permutation, the catalyst from the lead reactor can be rejuvenated and/or removed and replaced with fresh catalyst, whilst keeping the remainder of the reactor circuit operational.

The HDS catalyst at the inlet of the primary HDS reactor experiences a significantly higher concentration of asphaltenes and unsaturated coke precursors than the equivalent catalyst at the outlet of the secondary HDS reactor. However, the activation principle discussed above for the HDM section does not apply equally to the optimal utilization of the catalysts of the HDS section. One would expect that the catalyst at the inlet of the primary HDS reactor would be significantly more deactivated than catalyst at the outlet of the secondary HDS reactor. However, the inventors believe that the deactivation mechanism within the HDS reactors differs greatly from that of the HDM section; namely, coke deposition on the catalyst surface dominates the deactivation mechanism more so than the deposition of metals. This significant difference ultimately causes the deactivation profile of the HDS catalyst to behave differently than the deactivation profile of the HDM catalyst. In fact, the present inventors believe the HDS catalyst become deactivated more towards the outlet of the secondary HDS reactor, while the HDS catalyst at the inlet of the primary HDS reactor remains, relatively speaking, activated.

As discussed for the HDM Zone, it is at this point that the present invention allows a permutation that being a change in the directional flow from being incident first on the catalyst in the primary HDS reactor to now being incident on the catalyst in secondary HDS reactor. In an additional embodiment, during the permutation, the catalyst from the lead reactor can be rejuvenated and/or removed and replaced with fresh catalyst, whilst keeping the remainder of the reactor circuit operational. This permutation sequence therefore enables increased catalyst utilization for the HDS section, which improves the HDS activity of the overall catalyst system, by optimization of the coke profile present on the catalyst surface, prolonging the cycle length, which enables the process to function with a higher on stream factor, and therefore, be more economical.

In an additional embodiment, the present invention can advantageously operate without the use of guard reactors. In practice, guard reactors are smaller fixed bed catalyst reactors that are placed upstream of the main HDM and HDS reactors in order to remove large quantities of metal impurities. Furthermore, these guard reactors are typically switchable and can be taken off-line to periodically regenerate their catalysts. Therefore, embodiments of the present invention advantageously can achieve similar results without the need for additional equipment.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

This invention is intended for the selective removal of sulfur containing compounds from light to heavy sour crude oils. More particularly, this invention focuses on the use of catalytic hydrotreating processes in the form of a fixed catalyst bed arranged in a process configuration such that the order in which the reactors in each of the sections are used can be specified independently of their position. The catalytic section is defined as having a hydro-demetallization (HDM) section, followed by a hydro-desulfurization (HDS) section. The two stages applied in the method of the invention are operable to remove between 50-95% of the sulfur content in the sour crude at moderate temperature and pressure conditions and with reduced hydrogen consumption. In one embodiment, the process can include a distillation (topping) step to remove low boiling fractions, defined as lighter and including naphtha, from the whole crude, which reduces the volume of material to be processed and the degree of vaporization of the feedstock while providing a maximized hydrogen partial pressure.

In the case of residual fraction or whole crude oil treatment, hydrocarbons are catalytically hydrotreated using a catalyst and hydrogen. In the case of the removal of lighter fractions, the cuts can be subsequently recombined with the hydrotreated fraction reconstituting the full range crude.

Figure 1:
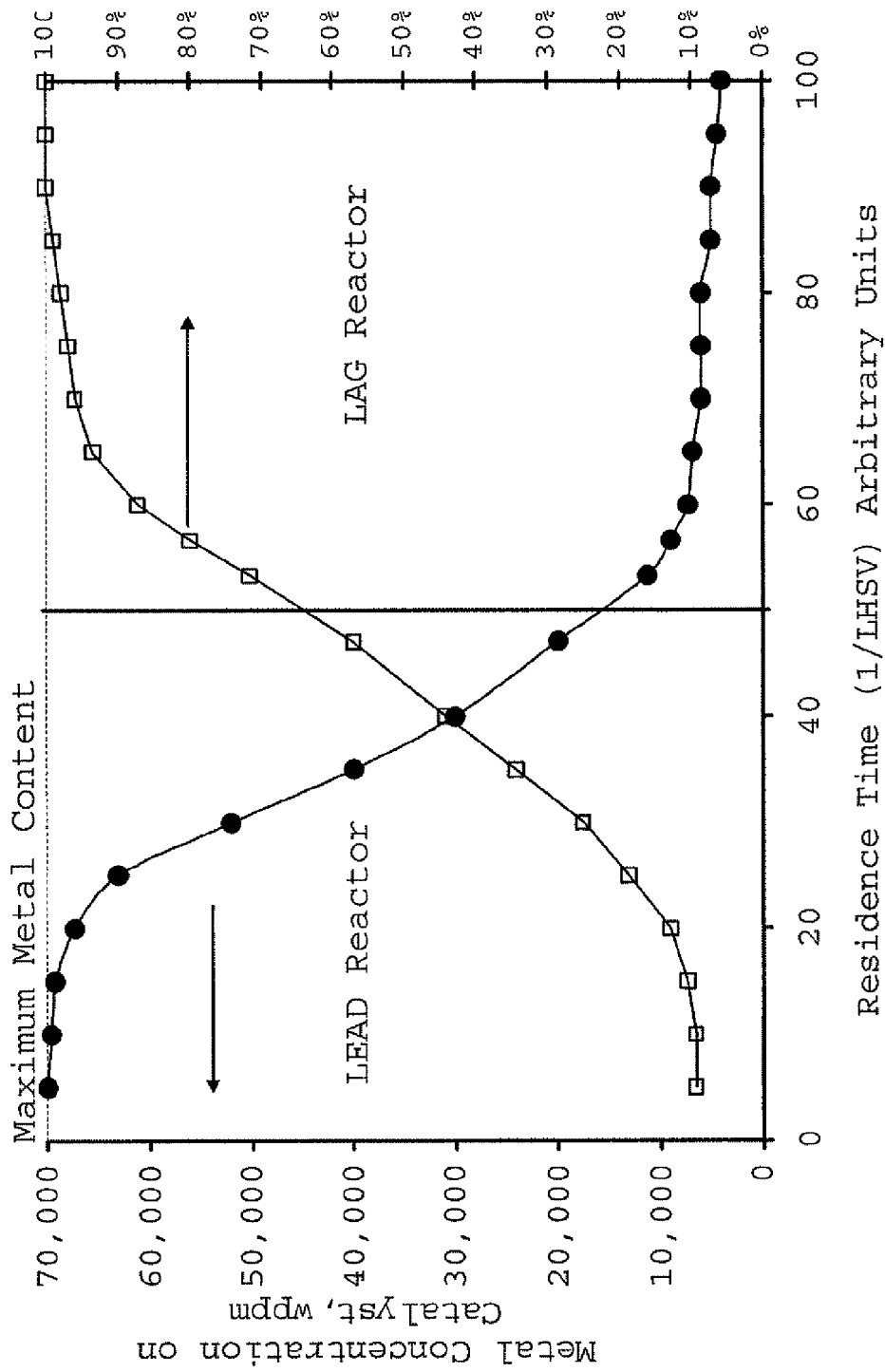
FIG. 1 illustrates the metal concentration and catalyst activity profiles for the catalysts within the HDM section.

One of the major technical challenges posed when hydrotreating heavy oil fractions or whole crude is the effect of minor concentrations of contaminants such as organic nickel and vanadium compounds. These organometallic components have been proven to detrimentally impact the activity of hydrotreating catalysts. The major contributing factor to the deactivation of the catalyst in the HDM section is the deposition of metals such as Nickel and Vanadium. These are mainly present in porphyrinic type structures within the crude oil. These compounds significantly deactivate downstream catalysts and are therefore required to be removed prior to any upgrading. The removal of the metals occurs via the HDM reaction and the metals are retained as sulfides in the pores of the catalyst. This occurs up until the maximum metals retention capacity for the catalyst is reached. Once this is reached, the catalyst is no longer capable of performing the HDM reaction, which generally results in the shutdown of the unit due to pressure drop constraints. A metals profile similar to the one shown in FIG. 1 is therefore obtained during the course of the run. It can therefore be seen that when the catalyst in the lead reactor in the permutable circuit is up to the maximum metals retention capacity, the catalyst has a very low relative volume activity (and vice versa). One way to alleviate the problems associated with this phenomena is to put the lead reactor in the lag position, and the lag reactor in the lead position.

The present invention aims to provide a system to significantly increase the utilization of the HDM catalyst by employing a permutable reactor system, whereby the flow of the feedstock can be changed from being incident on a primary HDM reactor of the HDM stage to being incident primarily on a secondary HDM reactor of the HDM stage. This permutable configuration provides an increased metals uptake and therefore aids the desulfurization of the whole crude for an increased on stream time. In another embodiment, during this permutation, the deactivated catalyst in the primary HDM reactor can be removed and replaced with fresh HDM catalyst, increasing the overall catalyst activity of the system.

However, the present invention also provides the added benefit of allowing permutations within the HDS section, but for an entirely different reason. Once the feed reaches the HDS section, the metals have already been removed to a large extent by passing through the catalysts in the HDM section. The chemical nature of the feedstock is now different. The deactivation mechanisms of the catalysts within the HDS section are therefore very different. Because a majority of the metal components within the input stream have already been removed, the major contribution to the deactivation of the catalyst system is the deposition of coke. Unsaturated compounds present in the feed are deposited on the catalyst surface; these undergo condensation reactions to form coke moieties, which deactivate the catalyst by blocking active sites and by plugging pores, reducing access to the active sites. However, these coke formations take time to develop.

Because the activity of the catalyst degrades faster towards the end of the run, changing the order of incidence with HDS reactors in series increases the overall catalyst utilization. This allows for continued operation whereas other processes result in coke build up within the reactor, which necessitates that the unit be shutdown.

The process of the present invention offers the flexibility to operate the unit without any shutdown due to catalyst deactivation on all sections. In addition to the HDM and HDS sections the present invention extends to a hydroconversion section (HDC), which in particular allows the upgrading in terms of conversion of heavier components of the crude oil to lighter components.

EXAMPLE 1

Permutations which Increase the Catalyst Cycle Length of the Process Unit

As has been detailed within the description of the invention the permutations allow an increased cycle length for the production of a Synthetic Crude Oil. These permutations afford increased catalyst utilization and therefore an increased profitability by allowing a higher on stream factor. Table I details some examples of these permutations.

TABLE I

Permutation for the Start of Run Configuration

| | Flow of Feedstock Sequence | | | |
|---|---|---|---|---|
| Start of Run Configuration | R1 | R2 | R3 | R4 |
| Permutation For Deactivation of Catalyst in HDM Section | R2 | R1 | R3 | R4 |
| Permutation For Deactivation of Catalyst in HDM Section followed by HDS Section | R2 | R1 | R4 | R3 |
| Permutation for Deactivation of Catalyst in HDS Section | R1 | R2 | R4 | R3 |

EXAMPLE 2

Production of Low Sulfur Crude Oils, Synthetic Crudes A and B

One embodiment of the present invention is the production of a synthetic crude oil from an Arab Heavy Crude Oil feedstock. Some typical properties of an Arab Heavy Feedstock processed can be seen in Table II below. The feedstock detailed in Table II was operated within the following boundary conditions as detailed within one embodiment of the present invention.

TABLE II

An Example of a Typical Feedstock to be Desulfurized by the Process

| Crude Origin | | Arabian Heavy Export |
|---|---|---|
| Density at 15° C. | g/ml | 0.8904 |
| CCR | wt % | 8.2 |
| Vanadium | wtppm | 56.4 |
| Nickel | wtppm | 16.4 |
| Sulfur | wt % | 2.83 |
| NaCl content | wtppm | <5 |
| C | wt % | 84.9 |
| H | wt % | 11.89 |
| O | wt % | 0.43 |
| N | wt % | 0.22 |

A 1000 ml tubular reactor was packed with 10% by volume of Catalyst A, 20% by volume of Catalyst B and 70% by volume of Catalyst C. The catalysts were then activated using a conventional pre-sulfiding technique, with DMDS sulfiding agent. The Arab Heavy feedstock as described in Table II was then passed over the catalyst combination at a Liquid Hourly Space Velocity of 0.5 volume of liquid feed per volume of catalyst per hour. The total hydrogen pressure of the reactor system was maintained at 100 bar and the hydrogen to hydrocarbon ratio was maintained at 1000 normal liters of hydrogen per liter of Arab Heavy Feedstock. The start of run temperature of the catalyst system was operated at between 360° C. and 370° C.

The properties of the desulfurized product were then analyzed, the results of this analysis, which represents the properties of the synthetic crude A, can be seen in Table III.

TABLE III

Properties of Synthetic Crude A

| Crude Origin | | Synthetic Crude A |
|---|---|---|
| Density at 15° C. | g/ml | 0.8732 |
| CCR | wt % | 4.5 |
| Vanadium | wtppm | 19.1 |
| Nickel | wtppm | 7.4 |
| Sulfur | wt % | 0.4400 |

The present invention is not; however, limited to the production of one grade of synthetic crude with the increased catalyst utilization. Rather, increased operating flexibility means that increased levels of HDS can be achieved while also retaining optimal catalyst cycle length. One example of this is the production of a synthetic crude B, the properties of which can be seen in Table IV.

TABLE IV

Properties of Synthetic Crude B

| Crude Origin | | Synthetic Crude B |
|---|---|---|
| Refractive index | | — |
| Density at 15° C. | g/ml | 0.8702 |
| CCR | wt % | — |
| Vanadium | wtppm | 8.9 |
| Nickel | wtppm | 2.9 |
| Sulfur | wt % | 0.17 |
| NaCl content | wtppm | — |
| C | wt % | — |
| H | wt % | — |
| O | wt % | — |
| N | wt % | — |
| S | wt % | — |

Additionally, embodiments of the present invention allow for the user to operate at lower operating pressures. The example below shows a study carried that demonstrates the effect of permutations regarding operating conditions. Table V, which can be found below, shows the catalyst temperature, known as the weighted average bed temperature (WABT), required to achieve 0.56 wt % sulfur from a feedstock initially containing 2.898 wt % sulfur. As the catalyst deactivates, the temperature required to maintain this level increases and therefore a temperature profile evolves over time. Columns A and B show the profile for a conventional fixed bed reactor operating at 100 bar and 80 bar total pressure respectively. Due to metallurgical (amongst other) constraints, in one embodiment the maximum allowable WABT has a nominal value of 400° C. Once this WABT is reached, the catalyst is considered spent and is required to be unloaded from the reactor and replaced with fresh catalyst. This point is known as the End of Run WABT. This can be seen more clearly from FIG. 2, which shows the same data in graphical format.

TABLE V

Weighted Average Bed Temperature (WABT) for Reactor Systems at 80 Bar and 100 Bar with and without Permutations

| On Stream Time (Months) | WABT (° C.) 100 bar | WABT (° C.) 80 bar | WABT (° C.) 100 bar with permutation | WABT (° C.) 80 bar with permutation |
|---|---|---|---|---|
| 0 | 370 | 375.2 | 370 | 375.16 |
| 1 | 372.6 | 378.4 | 372.6 | 378.36 |
| 2 | 375.2 | 381.6 | 375.2 | 381.56 |
| 3 | 377.8 | 384.8 | 377.8 | 384.76 |
| 4 | 380.4 | 388 | 380.4 | 387.96 |
| 5 | 383 | 391.2 | 383 | 391.16 |
| 6 | 385.6 | 394.4 | 385.6 | 394.36 |
| 7 | 388.2 | 397.6 | 388.2 | 397.56 |
| 8 | 390.8 | 400.8 | 390.8 | 385.81 |
| 9 | 393.4 | 404 | 393.4 | 389.01 |
| 10 | 396 | | 396 | 392.21 |
| 11 | 398.6 | | 398.6 | 395.41 |
| 12 | 401.2 | | 386.9 | 398.61 |
| 13 | | | 389.5 | 401.81 |
| 14 | | | 392.1 | |
| 15 | | | 394.7 | |
| 16 | | | 397.3 | |
| 17 | | | 399.9 | |
| 18 | | | 402.5 | |

Figure 2:
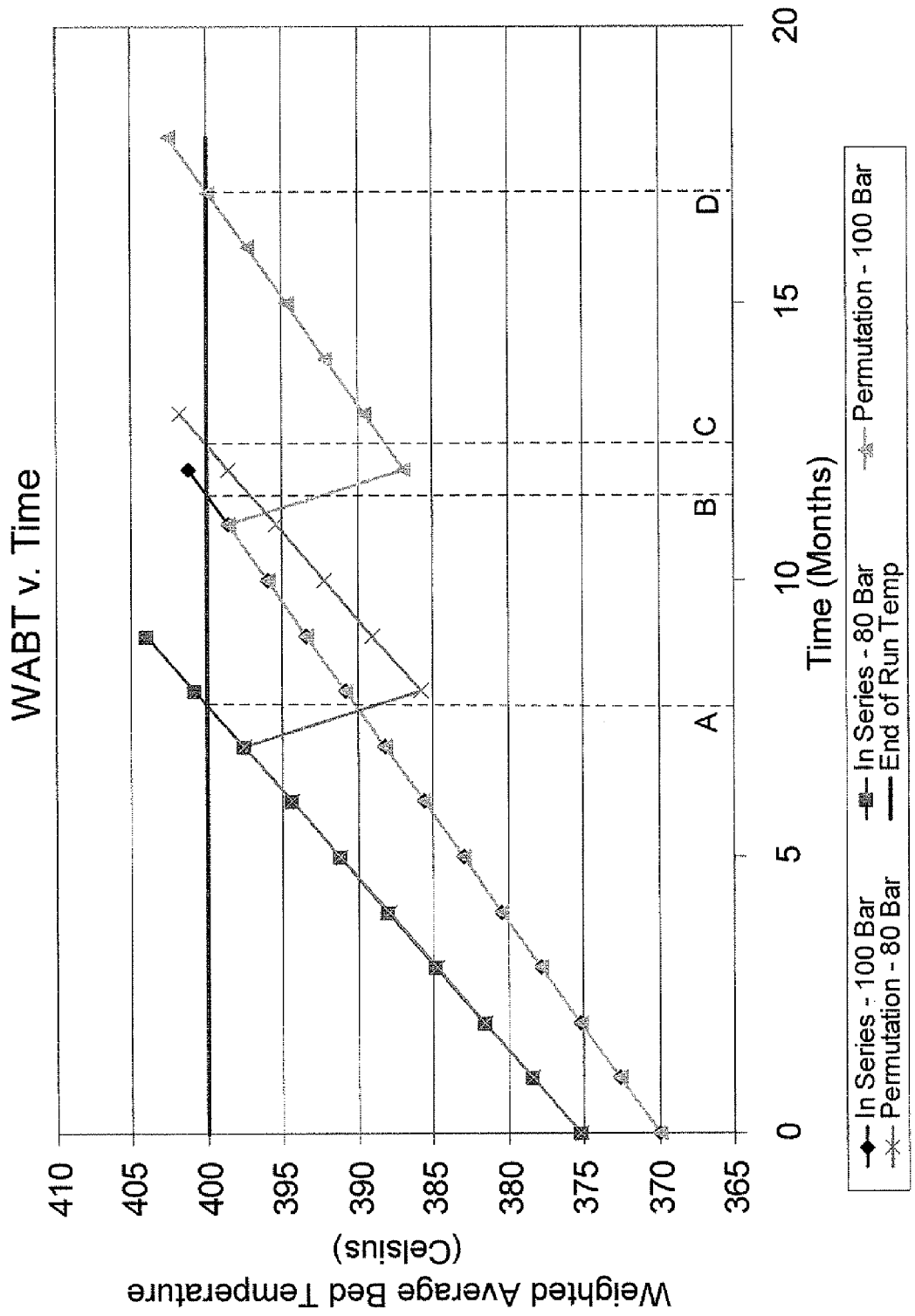
FIG. 2 graphically illustrates the advantages of operating in accordance with an embodiment of the present invention.

FIG. 2 shows that running the reactors at 100 bar versus 80 bar results in a lower WABT. However, this comes at the expense of increased operating costs. Fortuitously, by operating in accordance with embodiments of the present invention, improvements can be made by going from line A to line C (80 bar) and from line B to line D (100 bar). Clearly, even operating at 80 bar using the permutable process described herein results in an additional month of operating time over operating at 100 bar without using permutations. As such, embodiments of the present invention allow the user to operate at lower pressures and still achieve improved cycle lengths.

In one embodiment of the present invention, a continuous process for prolonging the useful life of hydro-demetallization (HDM) catalyst and hydro-desulfurization (HDS) catalyst in an HDM/HDS unit is provided. In this embodiment, the process includes feeding sour crude feed to an HDM section to remove contaminants, thereby creating an HDS feed stream, wherein the HDM section includes a primary HDM reactor and a secondary HDM reactor. The primary HDM reactor and the secondary HDM reactor being configured in a permutable fashion to create the HDS feed stream. This process further includes feeding the HDS feed stream to an HDS section such that at least a portion of the sulfur components within the HDS feed stream are removed. The HDS section comprises a primary HDS reactor and a secondary HDS reactor, with the primary HDS reactor and the secondary HDS reactor being fixed bed reactors and configured in a permutable fashion. The resulting product stream contains between 0.1 wt % and 1.0 wt % of total sulfur content.

In an additional embodiment, the present invention further comprises an absence of guard reactors. In a further embodiment, the process can further include separating a light fraction out of the whole crude oil feedstock prior to entering the HDM section, with the light fraction being defined as those hydrocarbons having a maximum boiling point of approximately 210° C. In yet a further embodiment, the separated light stream can be optionally processed/upgraded before being recombined with the product stream from the HDS section.

In yet an additional embodiment, the pressure drop and/or temperature can be measured across each of the reactors within the HDM and HDS sections. When the measured pressure drop and/or temperature exceeds a set value, the flow of the streams within the process can then be permutated such that the pressure drop and/or temperature is reduced to be within acceptable levels. In an additional embodiment, the HDS catalyst is a metal sulfide, wherein the metal is selected from the group consisting of Group VA, Group VIA, Group VIIIa, and combinations thereof. In a further embodiment, the HDS catalyst is in a supported form, with the supported form being selected from the group consisting of γ-alumina, silica, zeolite extrudates, spheres, cylinders, pellets, and combinations thereof.

In an alternate embodiment, the continuous process for prolonging the useful life of HDM and HDS catalysts in an HDM/HDS unit includes introducing crude oil into an HDM section to remove contaminants, thereby creating an HDM product stream. The HDM section includes a primary HDM reactor and a secondary HDM reactor, with the primary HDM reactor and the secondary HDM reactor being fixed catalyst bed reactors configured in a permutable fashion. Additionally, the primary HDM reactor and the secondary HDM reactor are capable of operating in a sequential fashion. Advantageously, the HDM product stream has reduced metals content as compared to the crude oil. The HDM product stream then is introduced into a hydroconversion (HDC) section to upgrade the HDM product stream, thereby forming an HDC product stream. The HDC section includes a primary HDC reactor and a secondary HDC reactor, whereby the primary HDC reactor and the secondary HDC reactor are fixed catalyst bed reactors configured in a permutable fashion. Advantageously, the HDC product stream has an increased API gravity as compared to the HDM product stream. The HDC product stream is then introduced to the HDS sections to remove the sulfur components from the HDC product stream. The HDS section includes a primary HDS reactor and a secondary HDS reactor. In this embodiment, the primary HDS reactor and the secondary HDS reactor are fixed bed reactors configured in a permutable fashion. The resulting product stream (HDS product stream) contains between 0.1 weight percent and 1.0 weight percent sulfur. Furthermore, the pressure drop and/or temperature can be measured for each of the aforementioned reactors, and the order in which the respective input streams flow within their respective sections (HDM, HDC, HDS) can be altered in order to achieve proper pressures and/or temperatures.

An embodiment of the present invention also includes an apparatus for prolonging the useful life of the HDM and HDS catalysts. The apparatus includes a wellhead, an HDM section and an HDS section. The HDM section includes a primary HDM reactor and a secondary HDM reactor configured in a permutable fashion. The HDS section includes a primary HDS reactor and a secondary HDS reactor configured in a permutable fashion. In this embodiment, the HDM section is operable to receive crude oil produced from the wellhead, and the HDS section is in liquid communication with the HDM section such that the HDS section is operable to receive a product stream from the HDM section. In a further embodiment, the apparatus can further include a tertiary HDM reactor and/or a tertiary HDS reactor. The respective tertiary reactors are also configured in a permutable fashion with the respective primary and secondary reactors. In additional embodiments, the reactors are configured such that any of the respective primary, secondary or tertiary reactors can be taken off-line to regenerate or replace catalysts while the apparatus is still on-line.

Figure 3:
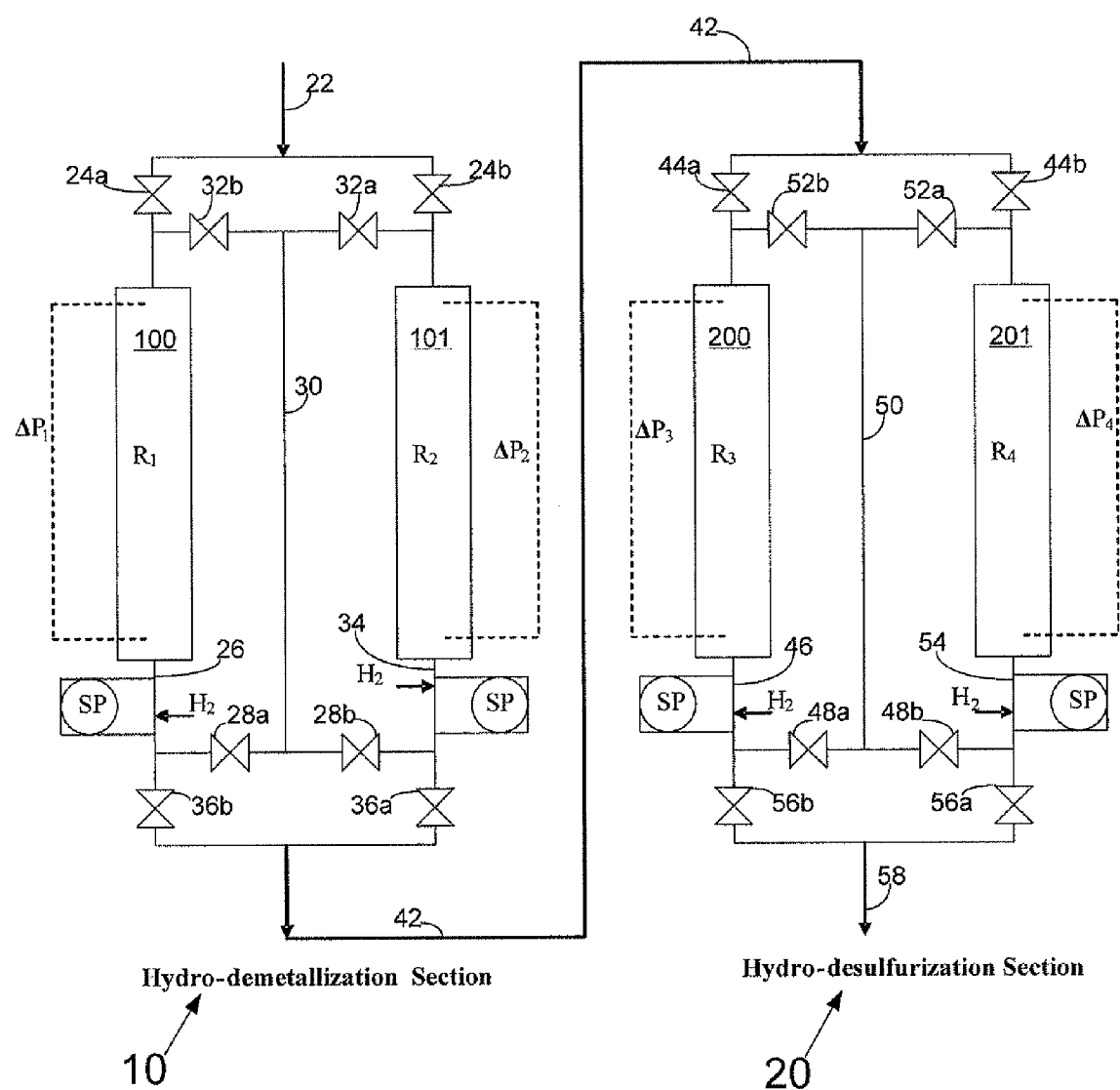
FIG. 3 is a perspective view of a continuous process diagram according to an embodiment of the present invention.

FIG. 3 illustrates one embodiment of the invention. Sour crude feed [22] is fed to hydrodemetallizing (HDM) section [10]. Sour crude feed [22] is fed into primary HDM reactor [100] via feed valve [24a]. Feed valve [24a] is generally in an open position while feed valve [24b] is generally in a closed position thereby directing sour crude feed [22] into primary HDM reactor [100]. In primary HDM reactor, hydro-demetallization occurs in the presence of a catalyst to create first treated stream [26]. First treated stream [26] flows through first treated stream valve [28a] to create treated stream [30]. First treated stream valve [28b] is maintained in the closed position. Treated stream [30] is fed into secondary HDM reactor [101], which acts as a lag reactor in this position. Second treated stream [34] exits secondary HDM reactor [101]. Second treated stream [34] contains substantially reduced amounts of metal components such as vanadium, organic nickel and other organometallic compounds as compared to sour crude feed [22].

At this point, first treated stream valve [28b] is closed such that second treated stream [34] is directed to exit flow valve [36a], which is generally in an open state. Exit flow valve [36b] is generally in a closed position, thereby causing the second treated stream [34] to exit HDM section [10] as hydrodesulfurization (HDS) feed [42].

HDS feed [42] then enters HDS unit [20]. HDS feed valve [44a] is generally open permitting HDS feed [42] to flow into primary HDS reactor [200]. HDS feed valve [44b] is generally closed. After treatment with catalyst in primary HDS reactor [200], primary sweetened stream [46] is removed and is directed through primary sweetened stream valve [48a], which is generally open, to create sweetened stream [50]. Primary sweetened stream valve [48b] is generally in a closed position. Sweetened stream [50] enters secondary HDS reactor [201] for further treatment in the presence of a catalyst. Secondary sweetened stream [54] is removed from secondary HDS reactor [201]. With primary sweetened stream valve [48b] and HDS exit flow valve [56b] in a closed position, and HDS exit flow valve [56a] in an open position, secondary sweetened stream [54] is directed into product stream [58]. Product stream [58] and HDS feed [42] can be monitored to ensure demetallization and desulfurization specifications are met. Four additional sample points [SP] can also be used to measure product quality following each of the respective reactors. Pressure drop in primary HDM reactor [100], secondary HDM reactor [101], primary HDS reactor [200] and secondary lead HDS reactor [201] can be monitored, for example using pressure gauges (not shown) located at the inlets and outlets of the reactors. Increase in pressure drop indicates state of catalyst within the respective reactor. Additionally, temperature gauges can be used in the process, for example at the inlets and outlets of the reactors in order to measure the WABT of each reactor. When the WABT approaches a predetermined limit, which in one embodiment is 400° C., the flow through the process should be permutated as described below in order to keep the WABT from exceeding the predetermined limit for a substantially constant product quality.

The process of the invention includes switching reactor order within HDM section [10], HDS section [20], or both such that the reactor that was previously in the secondary position subsequently is in the primary position. In order to accomplish this permutation, valves designated in FIG. 3 with subscript "a" are closed while valves designated with subscript "b" are opened. For example feed valve [24a], which was originally opened would be subsequently closed, while feed valve [24b], which was originally closed would be subsequently opened.

Figure 4:
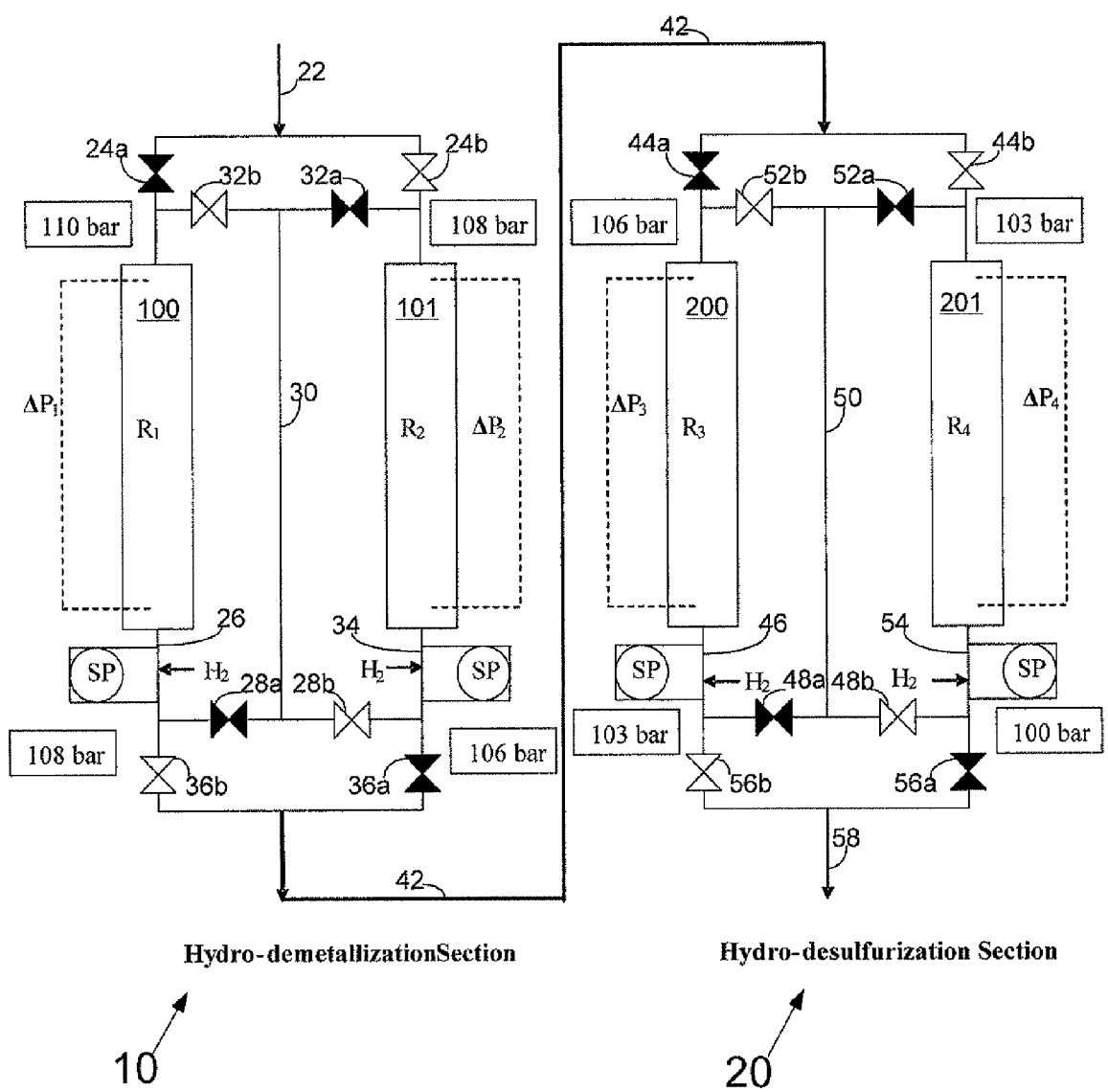
FIG. 4 is a perspective view of a continuous process diagram according to an alternate embodiment of the present invention.

FIG. 4 represents an embodiment of the process wherein sour crude feed [22] flows sequentially through primary HDM reactor [100], secondary HDM reactor [101], primary HDS reactor [200], and secondary HDS reactor [201]. Open valves are represented with shading, while closed valves are un-shaded. In order to achieve this particular sequential order of flow, valves [24a, 28a, 32a, and 36a] of HDM section [10] are open, while valves [24b, 28b; 32b, and 36b] of HDM section [10] are closed. Likewise for HDS section [20], valves [44a, 48a, 52a and 56a] are open while valves [44b, 48b, 52b and 56b] are closed.

Figure 5:
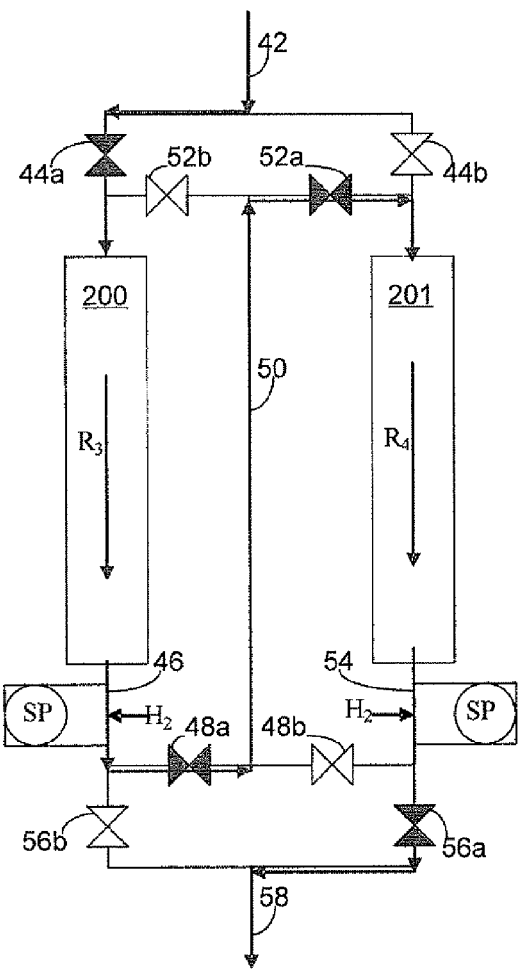
FIG. 5 is a perspective view of a continuous process diagram according to an embodiment of the present invention.
Figure 5:
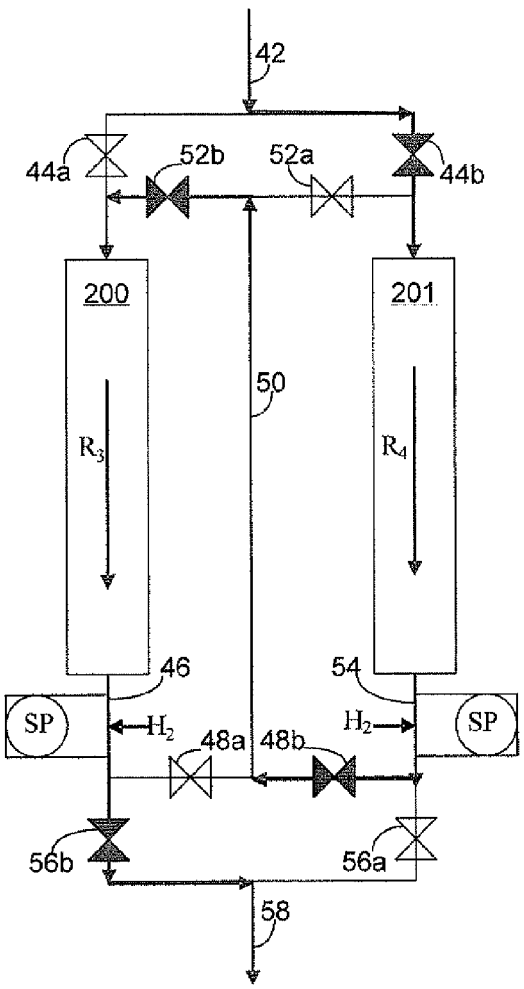

FIG. 5 represents a simplified diagram of the HDS section [20] in its original flow pattern and its permutation flow pattern. The original flow pattern is identical to that shown in FIG. 4. In the permutation flow pattern, valves [24b, 28b, 32b, and 36b] were switched from a closed position to an open position; while valves [24a, 28a, 32a, and 36a] were switched from an open position to a closed position. In this alternate flow pattern, HDS feed [22] enters secondary HDS reactor [201] first before subsequently entering primary HDS reactor [200].

Figure 6:
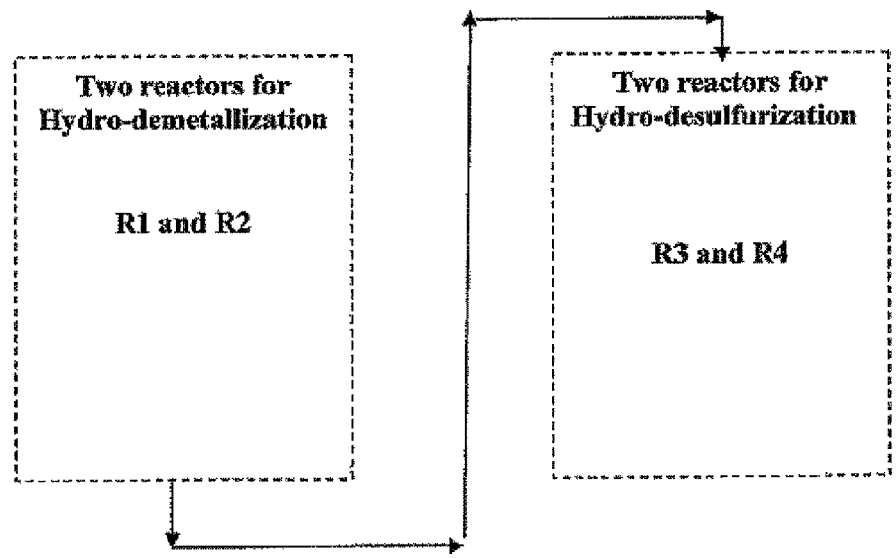
FIG. 6 is a perspective view of a continuous process diagram according to an alternate embodiment of the present invention.

FIG. 6 represents a simplified process flow chart of an embodiment of the present invention in which there are two reactors in the HDM section and two reactors in the HDS section.

Figure 7:
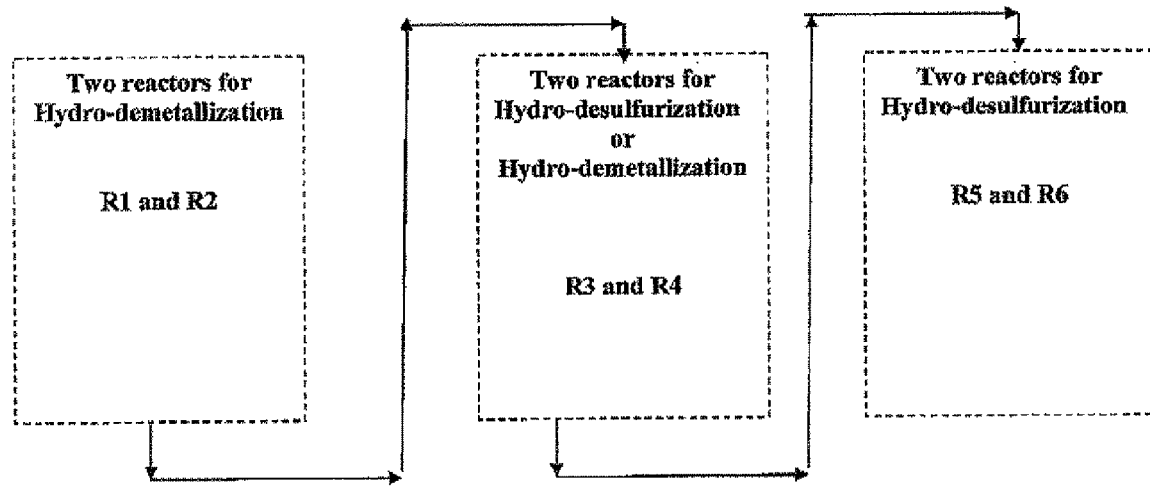
FIG. 7 is a perspective view of a continuous process diagram according to an embodiment of the present invention.

FIG. 7 represents a simplified process flow chart of an embodiment of the present invention in which there are a total of six reactors. The process includes at least two reactors (R1 and R2) in the HDM section and two reactors (R5 and R6) in the HDS section, with an additional two reactors that can be used in either the HDM section or the HDS section (R3 and R4).

Figure 8:
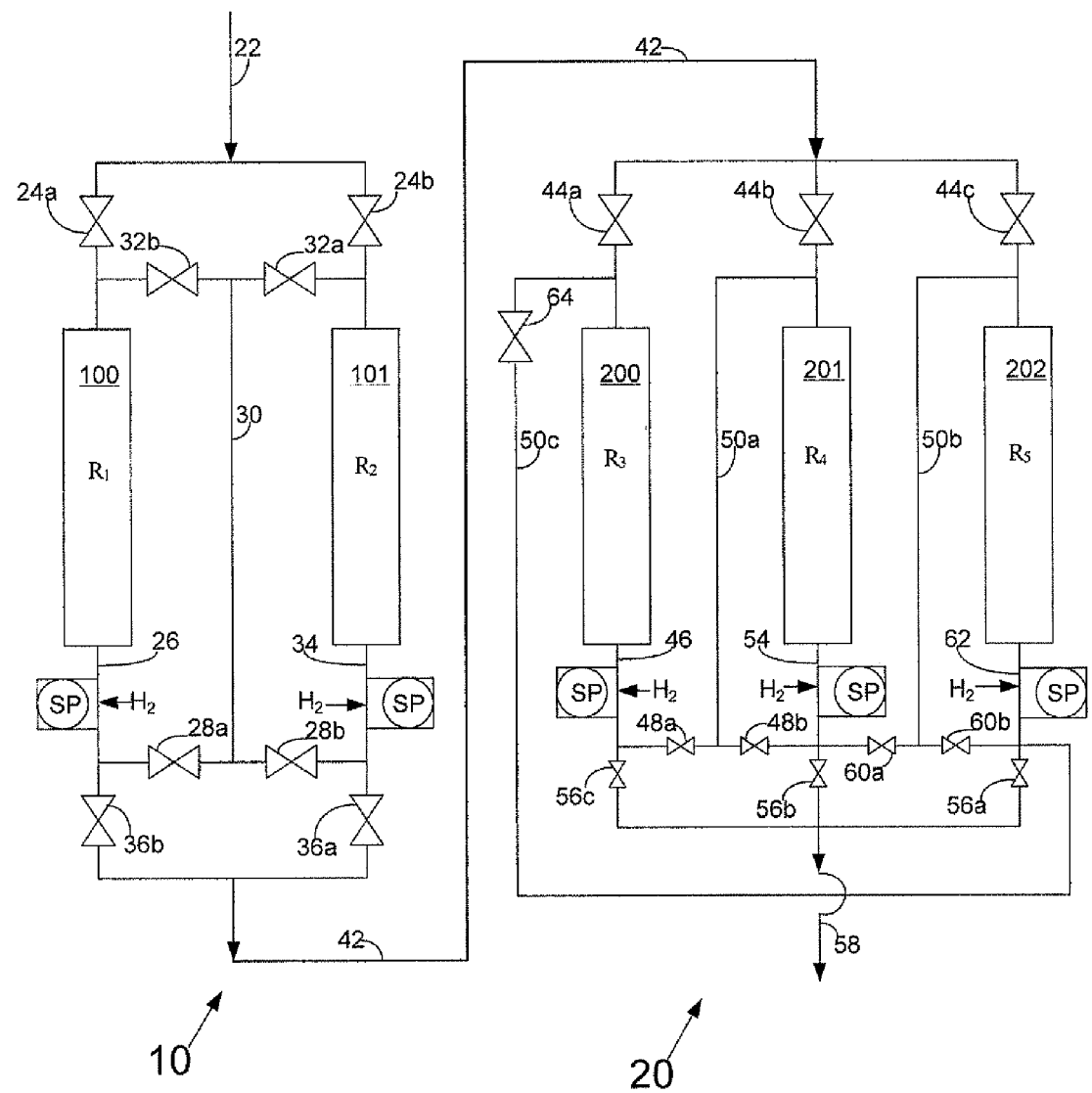
FIG. 8 is a perspective view of a continuous process diagram according to an alternate embodiment of the present invention.

FIG. 8 represents an embodiment of the present invention wherein there are two reactors in HDM section [10] and three reactors in HDS section [20]. The setup for HDM section [10] is the same is described for FIG. 3; however, HDS section [20] is slightly different than it was in FIG. 3. In the present embodiment, tertiary HDS reactor [202] is added, along with HDS feed valve [44c], secondary sweetened stream valves [60a, 60b], HDS exit flow valve [56c], and valve [64], while HDS secondary inlet valves [52a, 52b] are removed.

Figure 9:
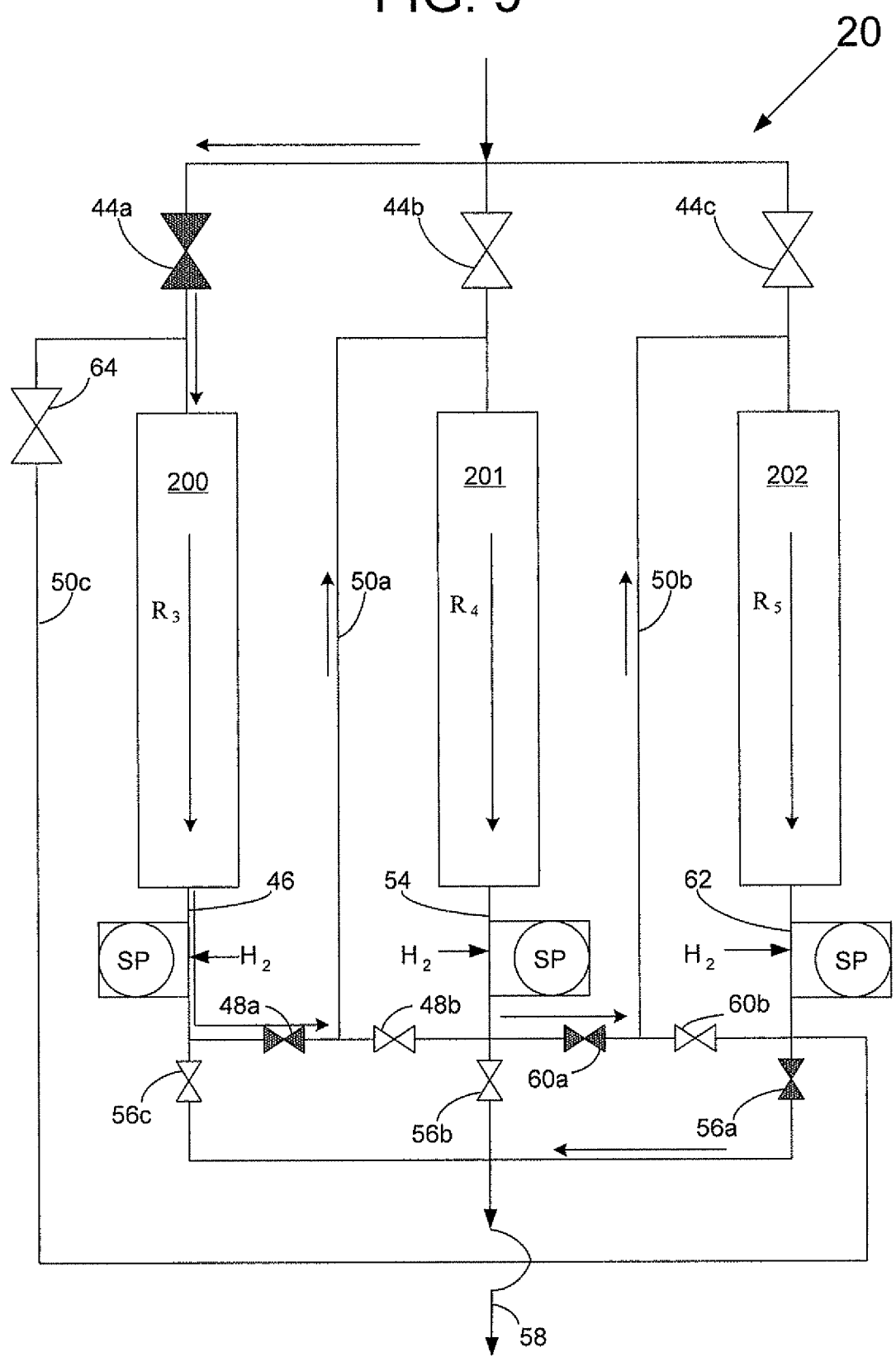
FIG. 9 is a perspective view of a continuous process diagram according to an embodiment of the present invention.

FIG. 9 illustrates only the HDS section [20] of an embodiment of the present invention. In this embodiment, HDS feed [42] travels through HDS feed valve [44a] and into primary HDS reactor [200] to form primary sweetened stream [46]. Primary sweetened stream [46] flows through primary sweetened stream valve [48a] to become sweetened stream [50a], where it is fed into secondary HDS reactor [201]. Even more sulfur is removed; forming secondary sweetened stream [54], which then flows through secondary sweetened stream valve [60a] and, becomes sweetened stream [50b], which is subsequently fed into tertiary HDS reactor [202]. Tertiary HDS reactor [202] provides additional sulfur removal yielding tertiary sweetened stream [62]. In this embodiment, tertiary sweetened stream [62] exits HDS section [20] via HDS exit now valve [56a] as product stream [58]. Valves that are shaded are open, while un-shaded valves are closed.

Figure 10:
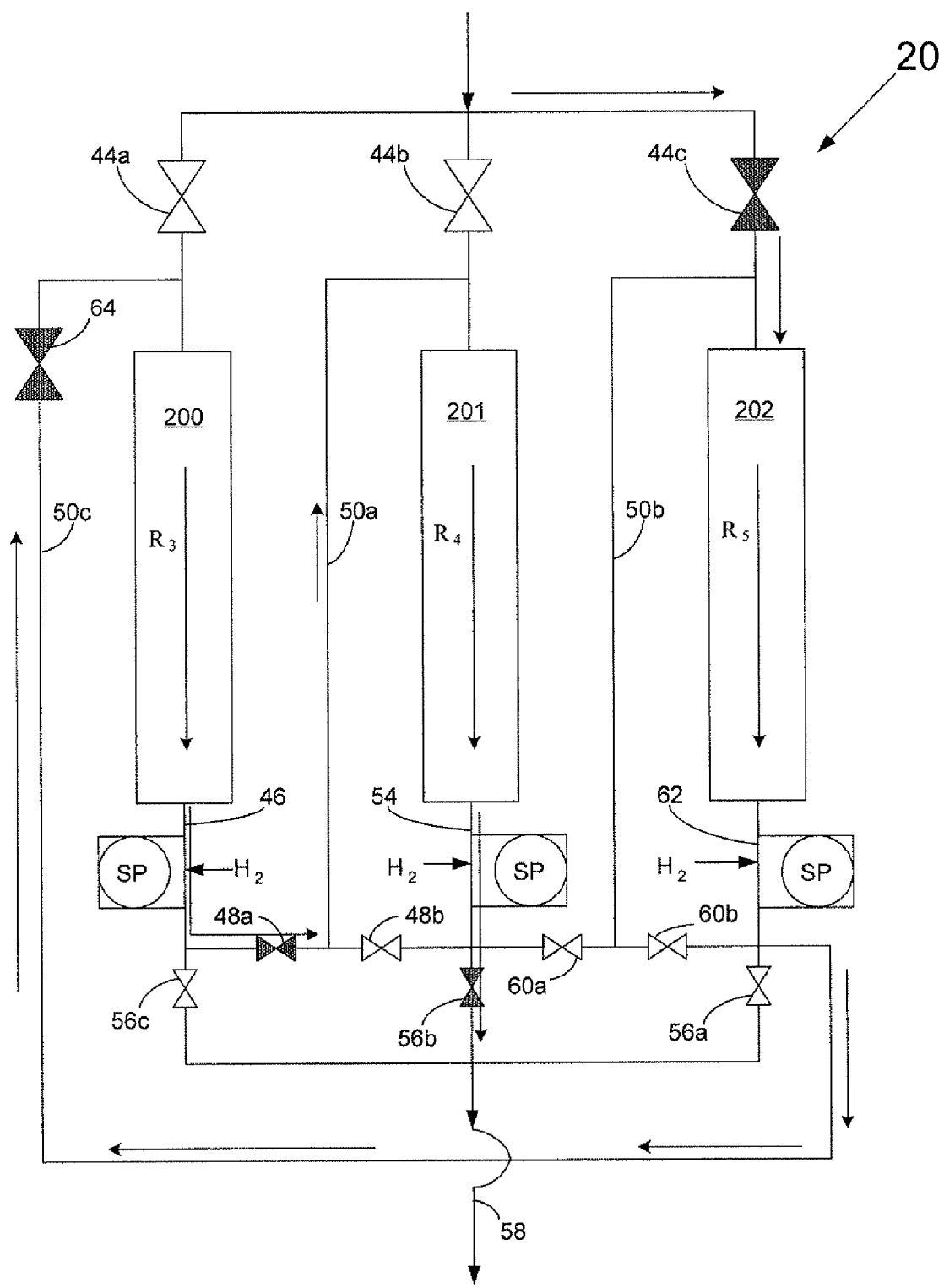
FIG. 10 is a perspective view of a continuous process diagram according to an alternate embodiment of the present invention.

FIG. 10 illustrates an alternate embodiment of HDS section [20] of the present invention. In this alternate embodiment, flow enters HDS section [20] via HDS feed valve [44c] and is directed from tertiary HDS reactor [202] to primary HDS reactor [200] and finally to secondary HDS reactor [201] before exiting HDS section [20] via HDS exit flow valve [56b]. Shaded valves are open, while un-shaded valves are closed.

Figure 11:
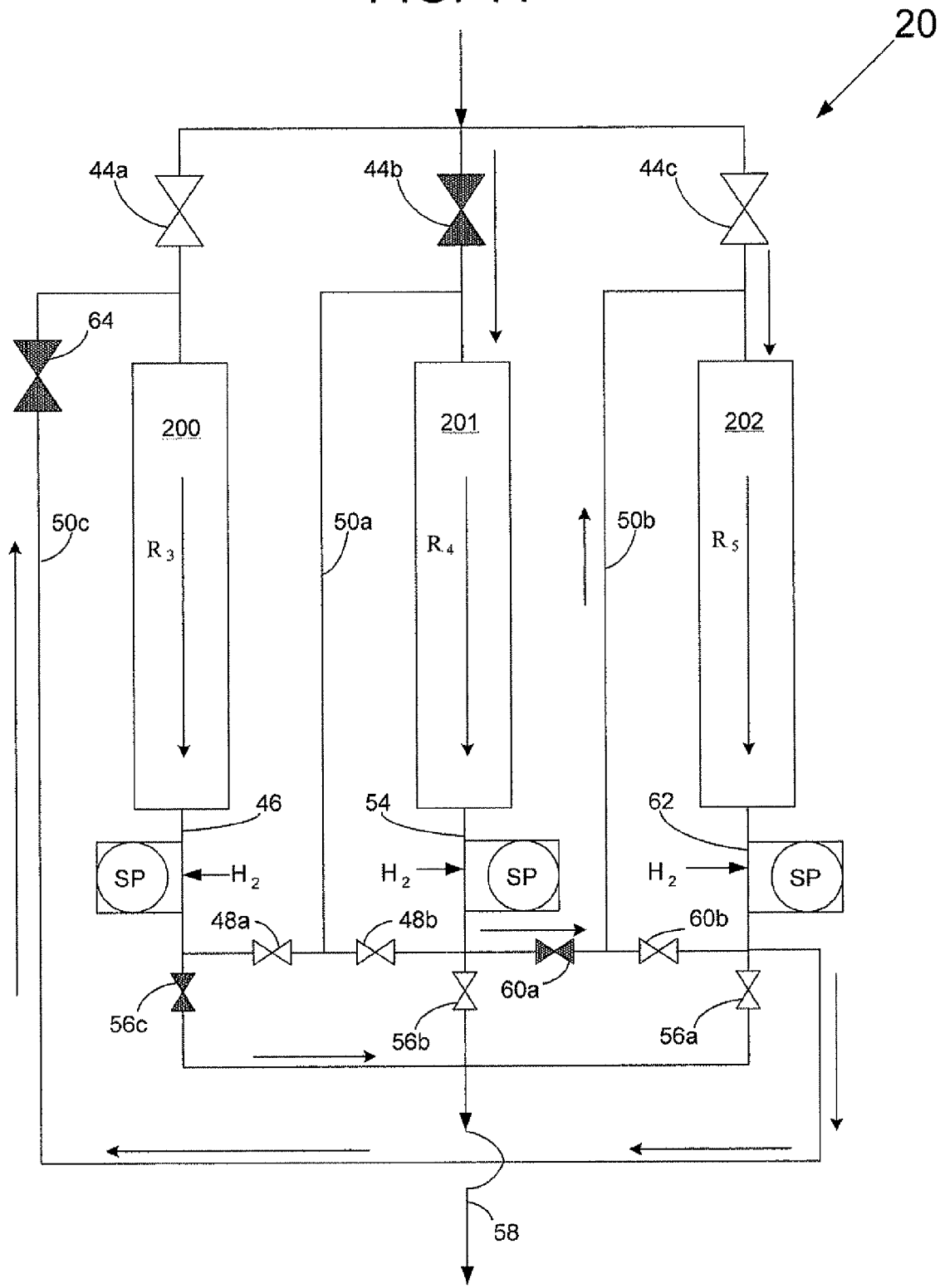
FIG. 11 is a perspective view of a continuous process diagram according to an embodiment of the present invention.

FIG. 11 illustrates another alternate embodiment of HDS section [20] of the present invention. In this alternate embodiment, flow enters HDS section [20] via HDS feed valve [44b] and is directed from secondary HDS reactor [201] to tertiary HDS reactor [202] and finally to primary HDS reactor [200] before exiting HDS section [20] via HDS exit flow valve [56c]. Shaded valves are open, while un-shaded valves are closed.

Figure 12:
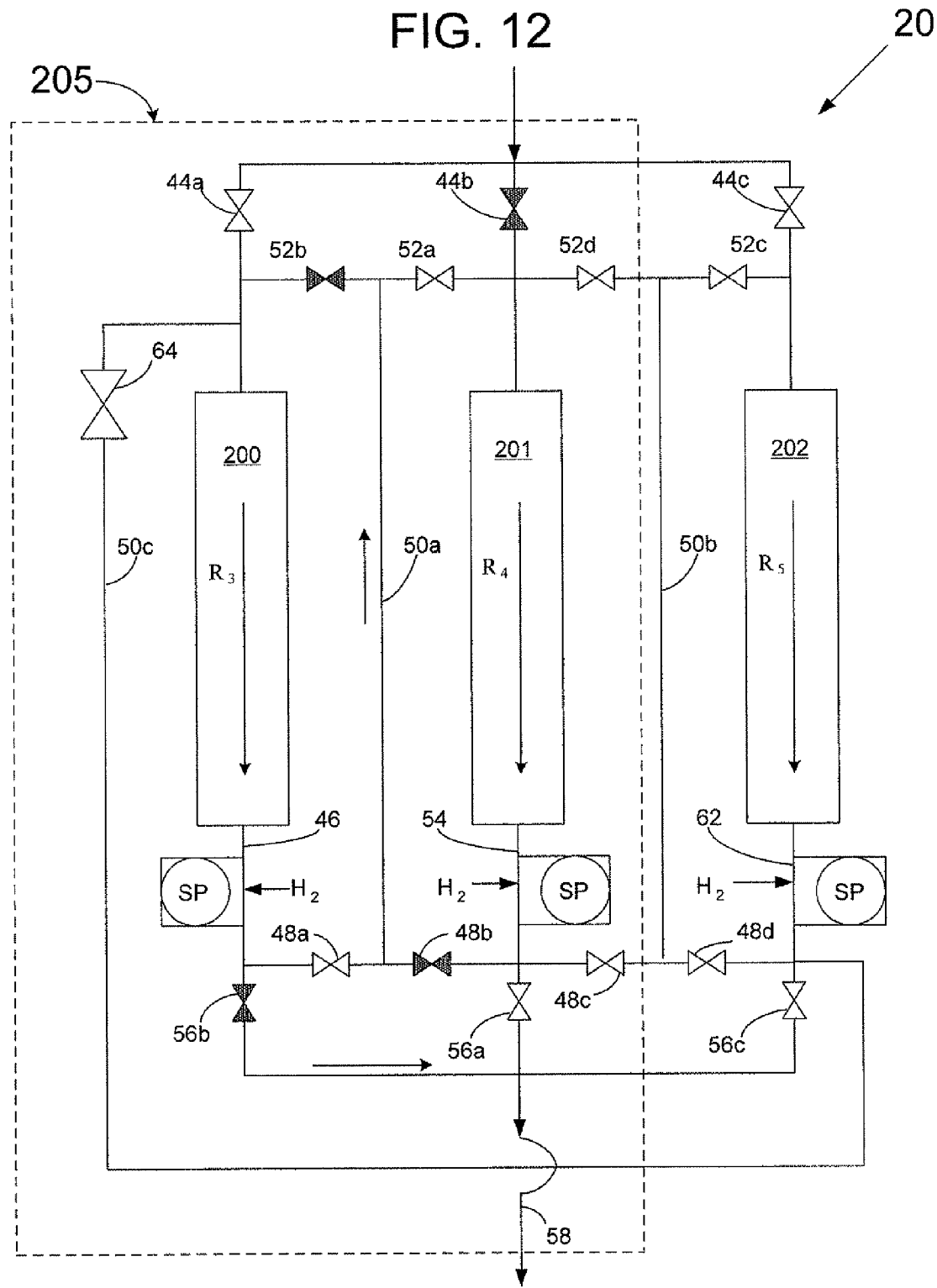
FIG. 12 is a perspective view of a continuous process diagram according to an alternate embodiment of the present invention.

FIG. 12 illustrates another alternate embodiment of HDS section [20]. In this embodiment, HDS section [20] includes three reactors; however, only two are in online operation [205] at one time while the third reactor, which would be tertiary HDS reactor [202], is offline so that its catalyst can be regenerated or replaced. In the embodiment shown in FIG. 12, HDS feed [42] enters HDS section [20] via HDS feed valve [44b] and is directed through secondary HDS reactor [201] to primary HDS reactor [200] and exits HDS section [20] via HDS exit flow valve [56b]. Shaded valves are open, while un-shaded valves are closed.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Those skilled in the art will recognize that many changes and modifications may be made to the system and method of practicing the invention without departing the scope and spirit of the invention. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

We claim:

1. A continuous process for prolonging the useful life of hydro-demetallization (HDM) catalyst and hydro-desulfurization (HDS) catalyst in an HDM/HDS unit comprising the steps of:
    feeding sour crude feed to an HDM section to remove contaminants, thereby creating an HDS feed stream, wherein the HDM section comprises a primary HDM reactor and a secondary HDM reactor, the primary HDM reactor and the secondary HDM reactor being configured in a permutable fashion to create the HDS feed stream; and
    feeding the HDS feed stream to an HDS section such that at least a portion of the sulfur components within the HDS feed stream are removed, creating a product stream, wherein the HDS section comprises a primary HDS reactor and a secondary HDS reactor, the primary HDS reactor and the secondary HDS reactor being fixed bed reactors and configured in a permutable fashion, such that the product stream contains between 0.1 wt % and 1.0 wt % of total sulfur content,
    wherein the primary HDM reactor, the secondary HDM reactor, the primary HDS reactor, and the secondary HDS reactor are configured in the permutable fashion in relation to one another, such that an operation of the primary HDM reactor, the secondary HDM reactor, the primary HDS reactor, and the secondary HDS reactor maintains a weighted average bed temperature of each reactor within a predetermined limit,
    the method further comprising
    separating a light fraction from the sour crude feed prior to feeding the sour crude feed to the HDM section, wherein the light fraction comprises a hydrocarbon having a maximum boiling point less than or equal to about 210° C.; and
    combining the light fraction with the product stream.

2. The continuous process of claim 1, wherein the HDM/HDS unit further comprises an absence of guard reactors.

3. The continuous process of claim 1, further comprising processing the light fraction in a separate reaction zone subsequent the separation step and prior to combining with the product stream.

4. The continuous process of claim 1, further comprising measuring the pressure drop across the primary HDM reactor, the secondary HDM reactor, the primary HDS reactor, and the secondary HDS reactor.

5. The continuous process of claim 4, further comprising altering the flow of the sour crude feed to the secondary HDM reactor by automated means.

6. The continuous process of claim 4, further comprising altering the flow of the HDS feed stream to the secondary HDS reactor by automated means.

7. The continuous process of claim 1, wherein the HDS section further comprises an HDS catalyst, wherein the HDS catalyst is a metal sulfide, wherein the metal is selected from the group consisting of Group Va, Group VIa, Group VIII of the periodic table, and combinations thereof.

8. The continuous process of claim 7, wherein the HDS catalyst is in a supported form, the supported form being selected from the group consisting of γ-alumina, silica, zeolite extrudates, spheres, cylinders, pellets, and combinations thereof.

9. The continuous process of claim 1, further comprising:
   (a) taking one of the reactors in the HDS section offline;
   (b) rejuvenating and/or replacing spent catalyst within said reactor; and
   (c) returning said reactor of the HDS section online, wherein HDS section remains operational during steps (a), (b) and (c).

10. The continuous process of claim 1, further comprising introducing the HDS feed stream into a hydroconversion (HDC) section prior to feeding the HDS feed stream to the HDS section, wherein the HDS feed stream is upgraded within the HDC section to create an HDC product stream, wherein the HDC section comprises a primary HDC reactor and a secondary HDC reactor, wherein the primary HDC reactor and the secondary HDC reactor are fixed catalyst bed reactors configured in a permutable fashion, the HDC product stream being characterized as having an increased API gravity as compared to the HDS feed stream, wherein the HDC product stream is then fed into the HDS section.

11. A continuous process for prolonging the useful life of hydro-demetallization (HDM) catalyst and hydro-desulfurization (HDS) catalyst in an HDM/HDS unit comprising the steps of:
   introducing crude oil into an HDM section to remove contaminants to create an HDM product stream, wherein the HDM section comprises a primary HDM reactor and a secondary HDM reactor, wherein the primary HDM reactor and the secondary HDM reactor are fixed catalyst bed reactors configured in a permutable fashion, the primary HDM reactor and the secondary HDM reactor are capable of operating in a sequential fashion, the HDM product stream having reduced metals content as compared to the crude oil;
   introducing the HDM product stream into a hydroconversion (HDC) section to upgrade the HDM product stream to create an HDC product stream, wherein the HDC section comprises a primary HDC reactor and a secondary HDC reactor, wherein the primary HDC reactor and the secondary HDC reactor are fixed catalyst bed reactors configured in a permutable fashion, the HDC product stream being characterized as having an increased API gravity as compared to the HDM product stream;
   introducing the HDC product stream into an HDS section such that at least a portion of the sulfur components within the HDC product stream are removed, thereby creating an HDS product stream, wherein the HDS section comprises a primary HDS reactor and a secondary HDS reactor, the primary HDS reactor and the secondary HDS reactor being fixed bed reactors configured in a permutable fashion, wherein the HDS product stream contains between 0.1 weight percent and 1.0 weight percent sulfur;
   measuring a process condition within the HDM section, the HDC section and the HDS section; and
   altering the order in which respective input streams for the HDM section, the HDC section and the HDS section enter their respective reactors of the HDM section, the HDC section and the HDS section based upon the measured process condition,
   wherein the primary HDM reactor, the secondary HDM reactor, the primary HDS reactor, and the secondary HDS reactor are configured in the permutable fashion in relation to one another, such that an operation of the primary HDM reactor, the secondary HDM reactor, the primary HDS reactor, and the secondary HDS reactor maintains a weighted average bed temperature of each reactor within a predetermined limit,
   the method further comprising
      separating a light fraction from the crude oil prior to feeding the crude oil to the HDM section, wherein the light fraction comprises a hydrocarbon having a maximum boiling point less than or equal to about 210° C.; and
      combining the light fraction with the HDM product stream.

12. The process of claim 11, wherein the process condition is pressure drop across one of the reactors.

13. The process of claim 11, wherein the process condition is weighted average bed temperature of one of the reactors.

14. The process of claim 11, wherein the process condition is the API gravity of the HDC section's effluent.

15. The process of claim 11, wherein the process condition is total metal content.

* * * * *